United States Patent [19]

Dunemann et al.

[11] 4,420,980
[45] Dec. 20, 1983

[54] ARRANGEMENT FOR MEASURING THE PRESSURE IN CYLINDRICAL CAVITIES

[75] Inventors: Klaus Dunemann, Karlsbad; Harald Fritz, Waldbronn, both of Fed. Rep. of Germany

[73] Assignee: Siemens Aktiengesellschaft, Munich, Fed. Rep. of Germany

[21] Appl. No.: 307,275

[22] Filed: Sep. 30, 1981

[30] Foreign Application Priority Data

Oct. 6, 1980 [DE] Fed. Rep. of Germany ....... 3037753

[51] Int. Cl.$^3$ .............................................. G01L 7/04
[52] U.S. Cl. ....................................... 73/730; 73/726; 73/119 A; 73/708
[58] Field of Search ..................... 73/730, 741, 119 A, 73/708, 862.63, 862.65, 862.67, 723–728, 765; 338/4

[56] References Cited

U.S. PATENT DOCUMENTS

| | | | |
|---|---|---|---|
| 2,420,148 | 5/1947 | Ostergren | 73/730 X |
| 2,747,408 | 5/1956 | Boytim et al. | 73/730 X |
| 2,814,946 | 12/1957 | Harris, Jr. | 73/862.65 |
| 3,164,014 | 1/1965 | Redner | 73/862.67 X |
| 3,261,204 | 7/1966 | Jacobson | 73/862.65 |
| 3,937,087 | 2/1976 | Heggie | 73/398 |
| 3,938,379 | 2/1976 | Bingham | 73/862.65 |
| 4,216,403 | 8/1980 | Krempl et al. | 73/119 A |
| 4,359,498 | 11/1982 | Mallon et al. | 310/338 X |

FOREIGN PATENT DOCUMENTS 1287317 1/1969 Fed. Rep. of Germany ........ 73/765

*Primary Examiner*—S. Clement Swisher
*Assistant Examiner*—Tom Noland
*Attorney, Agent, or Firm*—Kenyon & Kenyon

[57] ABSTRACT

An arrangement for measuring the pressure in a cylindrical cavity by measuring the expansion of the cylindrical cavity in the circumferential direction which results from the pressure within the cylindrical cavity. Such circumferential elongations are measured by a first electrical transducer which is responsive to elongations in the circumferential direction. Contractions in the circumferential direction which results from elongations in the longitudinal direction of the cylindrical cavity are compensated by measuring such longitudinal elongations with at least one further electrical transducer. Such longitudinal elongations may result from bending or tensile stresses. The sensitivity of the electrical transducer for measuring the longitudinal elongations corresponds to the sensitivity of the electrical transducer which measures circumferential elongations, multiplied by the reciprocal of the Poisson ratio. The electrical transducers are connected in series with one another, and in one embodiment, may be formed of wire strain gauges.

5 Claims, 3 Drawing Figures

ARRANGEMENT FOR MEASURING THE PRESSURE IN CYLINDRICAL CAVITIES

BACKGROUND OF THE INVENTION

This invention relates generally to pressure measuring systems, and more particularly, to an arrangement for measuring the pressure in cylindrical cavities by measuring the circumferential expansion of the cylindrical cavity by means of electrical pickups which are responsive to variations in length in at least one axis.

U.S. Pat. No. 3,937,087 describes an arrangement wherein a strain detector is mounted on the circumference of a fuel injection line of an internal combustion engine for producing a pressure-time history of the fuel injection cycle. In the known system, stresses in the fuel injection line which are not caused by pressure variations within the line are prevented from disturbing the pressure measurement by the provision of a steel housing which firmly surrounds a portion of the fuel injection line, and which extends on either side of the location of the strain detector. Such a housing contains an annular cavity which surrounds the strain detector.

It is a problem with known pressure monitoring systems that the monitoring of circumferential expansion of a fuel line in response to internal pressure is disturbed by bending and longitudinal stresses which result from the running of the engine. Such disturbances, therefore, result from vibratory motions and forces which occur during operation of the engine, and interfere with the measurement of circumferential elongations which result from pressure variations within the cylindrical fuel line.

It is, therefore, an object of this invention to provide an arrangement for measuring the pressure within a cylindrical cavity, and which provides improved suppression of signals which result from other forces acting upon the cylindrical cavity.

It is further object of this invention to provide a pressure measurement system which compensates for disturbances which affect circumferential expansion of the cylindrical cavity by determining longitudinal elongations which result from flexure or tensile stresses.

SUMMARY OF THE INVENTION

The foregoing and other objects are achieved by this invention which provides a first transducer for determining the circumferential elongation of the cylindrical cavity. The component of such cylindrical elongation which results from flexure and tensile forces is compensated by a second transducer responsive to longitudinal elongation of the cylindrical cavity. The second transducer is of a type which has an elongation sensitivity, as compared to the first pickup, which corresponds to the reciprocal value of the Poisson ratio. The first and second transducers are electrically coupled to one another in a series circuit arrangement.

In one embodiment, the first and second transducers are arranged close to one another with respect to the circumferential and longitudinal directions. In a further embodiment of the invention, a further pair of closely spaced and series-connected transducers is arranged opposite to the first pair along the circumference of the cylinder. The respective pairs of series-connected transducers are electrically connected in opposite arms of an electrical bridge circuit.

As noted, each of the strain transducers detects elongation along a predetermined axial direction, illustratively along the circumferential and longitudinal directions. Suitable ones of such monoaxial strain transducers may be formed as wire strain gauges in the form of strips. The strain gauge strip transducers which are provided for detecting longitudinal elongation are each provided with a resistance value which corresponds to the resistance value of the transducer strips which detect circumferential elongation, multiplied by the reciprocal of the Poisson ratio.

It is a feature of this invention that the present invention is advantageously suitable for measuring the pressure in fuel injection lines of internal combustion diesel engines.

BRIEF DESCRIPTION OF THE DRAWINGS

Comprehension of the invention is facilitated by reading the following detailed description in conjunction with the annexed drawings, in which.

DETAILED DESCRIPTION

Figure 1:
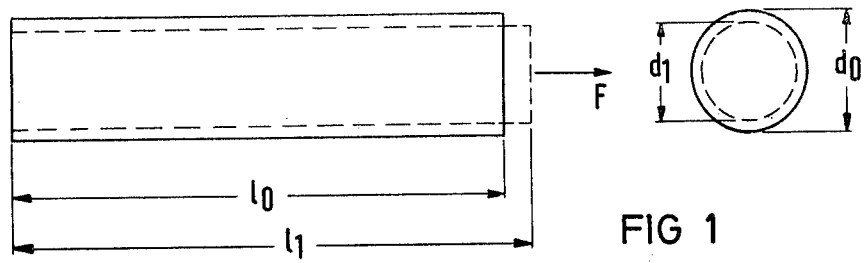
FIG. 1 shows longitudinal and cross-sectional views of a tension-stressed cylindrical body.

FIG. 1 shows a plan view and a cross-sectional view of a cylindrical body which is clamped at one end and loaded at its free end with a tensile force F. As a result of tensile force F, the cylindrical body is elongated from its original length $l_0$ to a greater length $l_1$. The length of the deformation, which corresponds to the difference between the loaded and unloaded lengths, is: $l_0 - l_1 = \Delta l$. In addition to such longitudinal deformation, the cylindrical body, under the influence of tensile force F, experiences a diametrical, or circumferential, deformation from an original diameter $d_0$ to a smaller diameter $d_1$, as shown in the cross-sectional view of FIG. 1. Thus, the cross-sectional deformation may be expressed as $\Delta d = d_0 - d_1$. The elongation in the longitudinal direction is $\xi_1 = l/l_0$, and the transversal elongation is $\xi_q = d/d_0$. The ratio of the two elongations $\xi_1/\xi_q$ is called "Poisson's ratio" in the field of mechanics. Poisson's ratio is a measure of the effect of a longitudinal elongation via the transverse contraction. Its reciprocal value is called the "transversal coefficient" and is approximately 0.3 for steel.

In a pipe subjected to internal pressure, a longitudinal elongation of one-half of the transversal coefficient occurs in addition to circumferential elongation. The additional strain gauges which are responsive to longitudinal elongation provide an improvement in the measurement of the internal pressure.

Figure 2:
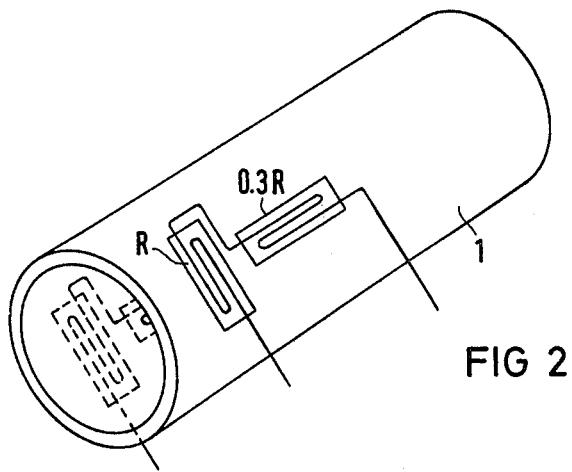
FIG. 2 is a perspective view of a section of pipe line having wire strain gauge transducers attached thereto.

FIG. 2 is perspective view of a section of a pipe line 1. Pipe line 1 is equipped with wire strain gauges R which detect the expansion of the pipe line in the circumferential direction in response to the internal pressure. While under pressure, pipe line 1 is stretched in the longitudinal direction. However, as a result of the transverse contraction which accompanies longitudinal expansion, such elongation results in a decrease in the measurable effect in the circumferential direction. Such a reduction in the measurable effect can be compensated by a second wire strain gauge 0.3 R connected in series with wire strain gauge R. In this embodiment, 0.3 is the dimensionless transversal coefficient, i.e., the reciprocal value of the Poisson ratio which is the determining factor for the transverse contraction. For metals, particularly steel, the transversal coefficient can be assumed to be 0.3. A second pair of wire strain gauges which are shown by dashed line phantom representation, are shown to be on the backside of pipe line 1. The second pair of wire strain gauges consist of a strip R which is arranged to be responsive to circumferential elongation of the pipe and a strip 0.3 R which is responsive to the longitudinal elongation.

Figure 3:
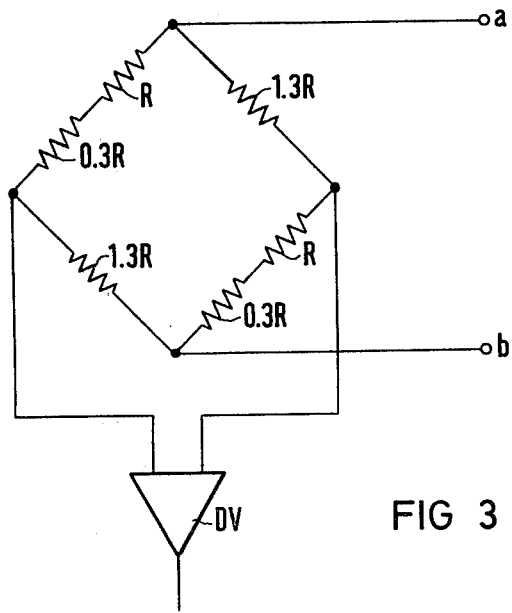
FIG. 3 is a schematic diagram of an electrical bridge circuit showing the interconnection between the individual wire strain gauge transducers.

FIG. 3 is a schematic representation of a bridge circuit wherein the respective series combinations of respective R and 0.3 R wire strain gauges are connected on opposite bridge arms. The remaining opposite bridge arms are each provided with a respective resistor 1.3 R, which complete the bridge circuit. An appropriate supply potential is applied across a pair of terminals a and b. The remaining terminals of the bridge circuit are connected to respective input terminals of a differential amplifier DV. An indicating instrument or further electronic circuitry for processing the measurement data can be coupled to the output terminal of differential amplifier DV.

Although the invention has been described in terms of a specific embodiment for specific applications, other embodiments and applications, in light of this teaching, would be obvious to persons skilled in the art. Accordingly, it is to be understood that the drawings and descriptions in this disclosure are merely illustrative of the principles of the invention, and should not be construed to limit the scope thereof.

What is claimed is:

1. An arrangement for measuring the pressure in a cylindrical cavity by measuring the expansion of the cylindrical cavity in the circumferential direction by means of a first electrical transducer having a predetermined sensitivity to elongation of the cylindrical cavity in the circumferential direction, the arrangement further comprising a second electrical transducer responsive to elongation of the cylindrical cavity along a longitudinal direction, said second electrical transducer having a sensitivity to said longitudinal elongation which corresponds to the product of the predetermined sensitivity of the first electrical transducer and the reciprocal value of the Poisson ratio, the first electrical transducer and said second electrical transducer being connected in series with one another.

2. The arrangement of claim 1 wherein the first and said second electrical transducers are arranged close to one another with respect to their respective spacings in the circumferential and said longitudinal directions.

3. The arrangement of claim 2 further comprising third and fourth electrical transducers connected in series with one another, said third and fourth electrical transducers being arranged so as to be responsive to circumferential and longitudinal elongations, respectively, of the cylindrical cavity, said third and fourth electrical transducers being connected in an arm of a bridge circuit, and the first and said second electrical transducers being connected in a further bridge arm of said bridge circuit.

4. The arrangement of claim 3 wherein the first and said second, third, and fourth electrical transducers are resistance strain gauges, said second and fourth electrical transducers each having a respective resistance value which corresponds to the resistance value of the associated one of the first and said third electrical transducers multiplied by a transversal coefficient.

5. The arrangement of claim 1 wherein the cylindrical cavity is a fuel line of a fuel injection system for an internal combustion diesel engine.

* * * * *